United States Patent
Yoshizawa

(10) Patent No.: US 7,103,057 B2
(45) Date of Patent: Sep. 5, 2006

(54) INFORMATION PROCESSING APPARATUS AND COMMUNICATION FUNCTION EXPANSION METHOD

(75) Inventor: Junichi Yoshizawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1113 days.

(21) Appl. No.: 09/917,919

(22) Filed: Jul. 31, 2001

(65) Prior Publication Data

US 2002/0031139 A1 Mar. 14, 2002

(30) Foreign Application Priority Data

Aug. 1, 2000 (JP) .............................. 2000-233130

(51) Int. Cl.
*H04L 12/28* (2006.01)
*H04L 12/56* (2006.01)
*H04J 1/16* (2006.01)
*H04J 3/16* (2006.01)

(52) U.S. Cl. ...................... 370/419; 370/422; 370/423; 710/2; 710/301; 710/316

(58) Field of Classification Search ................ 370/419, 370/422, 423; 710/1, 2, 28, 29, 33, 36, 100, 710/106, 300, 301, 305, 313, 314, 315, 316
See application file for complete search history.

(56) References Cited

U.S. PATENT DOCUMENTS

| | | | | |
|---|---|---|---|---|
| 5,625,847 A * | 4/1997 | Ando et al. | .................... | 710/60 |
| 5,748,912 A * | 5/1998 | Lee | ............................ | 710/301 |
| 5,748,913 A * | 5/1998 | Shibahara | .................... | 710/301 |
| 5,907,545 A * | 5/1999 | Arai et al. | .................... | 370/342 |
| 5,907,686 A * | 5/1999 | Zenda | ........................ | 710/301 |
| 6,009,492 A * | 12/1999 | Matsuoka | ................... | 710/301 |
| 6,052,120 A * | 4/2000 | Nahi et al. | .................. | 715/700 |
| 6,370,318 B1 * | 4/2002 | Iwaki | .......................... | 386/94 |
| 6,671,763 B1 * | 12/2003 | Korowitz et al. | ........... | 710/301 |
| 6,760,601 B1 * | 7/2004 | Suoknuuti et al. | .......... | 455/557 |
| 6,901,241 B1 * | 5/2005 | Bjorndahl | .................. | 455/41.2 |
| 6,930,983 B1 * | 8/2005 | Perkins et al. | .............. | 370/252 |
| 2001/0006902 A1 * | 7/2001 | Ito | ............................. | 455/558 |
| 2001/0017853 A1 * | 8/2001 | Kikuchi et al. | ............. | 370/335 |
| 2001/0024444 A1 * | 9/2001 | Asai | ............................ | 370/401 |

(Continued)

FOREIGN PATENT DOCUMENTS

JP 6-113004 4/1994

(Continued)

OTHER PUBLICATIONS

ITU-T Recommendation H.324: Terminal for low bit-rate multimedia communication, Telecommunication Standardization Sector of the International Telecommunication Union, Series H: Audiovisual and Multimedia Systems, Infrastructure of audiovisual services—Systems and terminal equipment for audiovisual services (Feb. 1998).

(Continued)

*Primary Examiner*—Chirag Shah
(74) *Attorney, Agent, or Firm*—Finnegan, Henderson, Farabow, Garrett & Dunner, L.L.P.

(57) ABSTRACT

An information processing apparatus includes a CPU and a memory connected to an internal local bus, and includes a data transmission/reception unit transmitting and receiving data to and from a public network, a voice encoding/decoding unit encoding and decoding voice data, an image encoding/decoding unit encoding and decoding image data, an external input/output interface controller controlling an input/output interface with an external unit, and an input/output switching unit selectively forming a data bus among the data transmission/reception unit, the voice encoding/decoding unit, the image encoding/decoding unit and the external input/output interface controller.

10 Claims, 11 Drawing Sheets

U.S. PATENT DOCUMENTS

| | | | |
|---|---|---|---|
| 2001/0042149 A1* | 11/2001 | Ito et al. | 710/102 |
| 2001/0053701 A1* | 12/2001 | Hattori | 455/550 |
| 2001/0056502 A1* | 12/2001 | Hollstrom et al. | 709/250 |
| 2002/0065099 A1* | 5/2002 | Bjorndahl | 455/553 |
| 2002/0180715 A1* | 12/2002 | Konuta et al. | 345/204 |
| 2003/0012156 A1* | 1/2003 | Fukuda | 370/329 |
| 2004/0228361 A1* | 11/2004 | Skarpness | 370/463 |
| 2005/0006484 A1* | 1/2005 | Ito | 235/492 |
| 2005/0213544 A1* | 9/2005 | Kikuchi et al. | 370/335 |

FOREIGN PATENT DOCUMENTS

| | | |
|---|---|---|
| JP | 8-234931 | 9/1996 |
| JP | 9-149107 | 6/1997 |
| JP | 9-305508 | 11/1997 |
| JP | 11-41133 | 2/1999 |
| JP | 11-308664 | 11/1999 |
| JP | 2000-197026 | 7/2000 |

OTHER PUBLICATIONS

"Standard Bus Interface Expedition," Electronics Japan, Ohmsha, Ltd., Jul. 28, 2000, vol. 45, No. 8, pp. 18-20.

"Wireless Revocation Made by Bluetooth, Mounted on 30 Percent of Portable Telephone, and Accelerating Mobile Age," Telecommunications, Japan, RIC Telecom Corporation, May 25, 2000, vol. 17, No. 6, pp. 76-79.

* cited by examiner

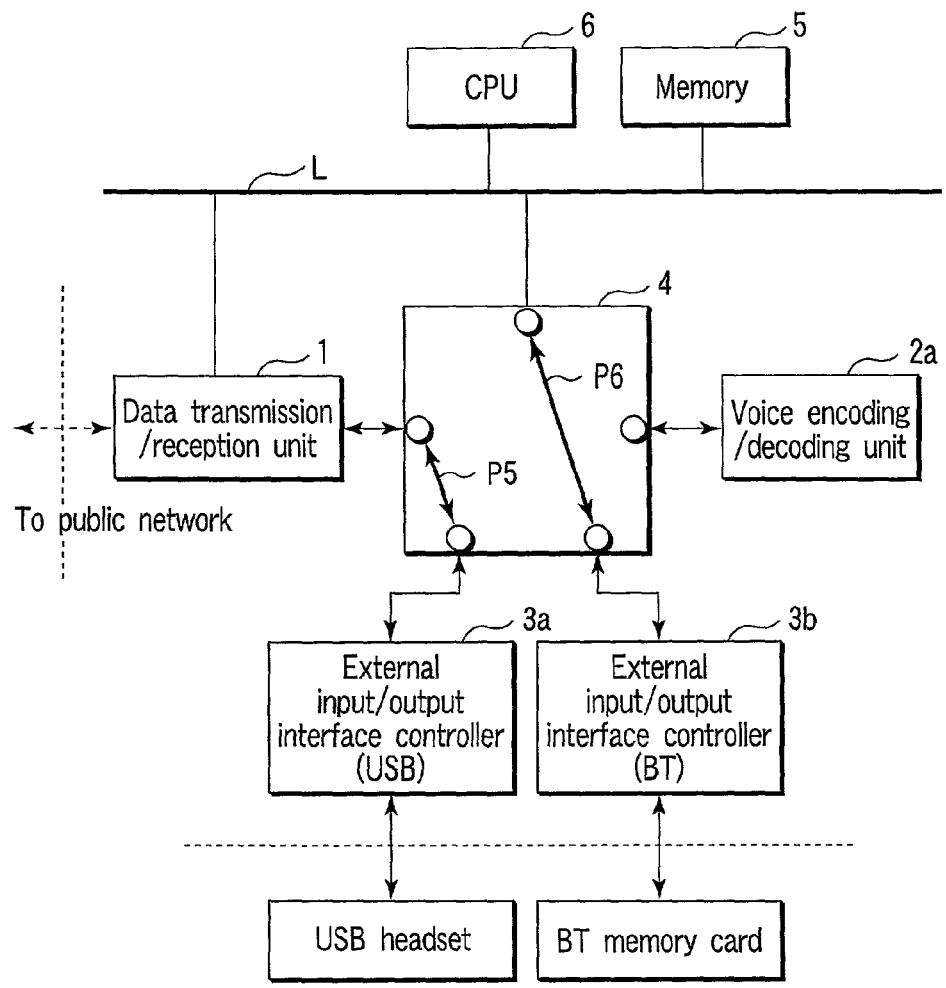
F I G. 9

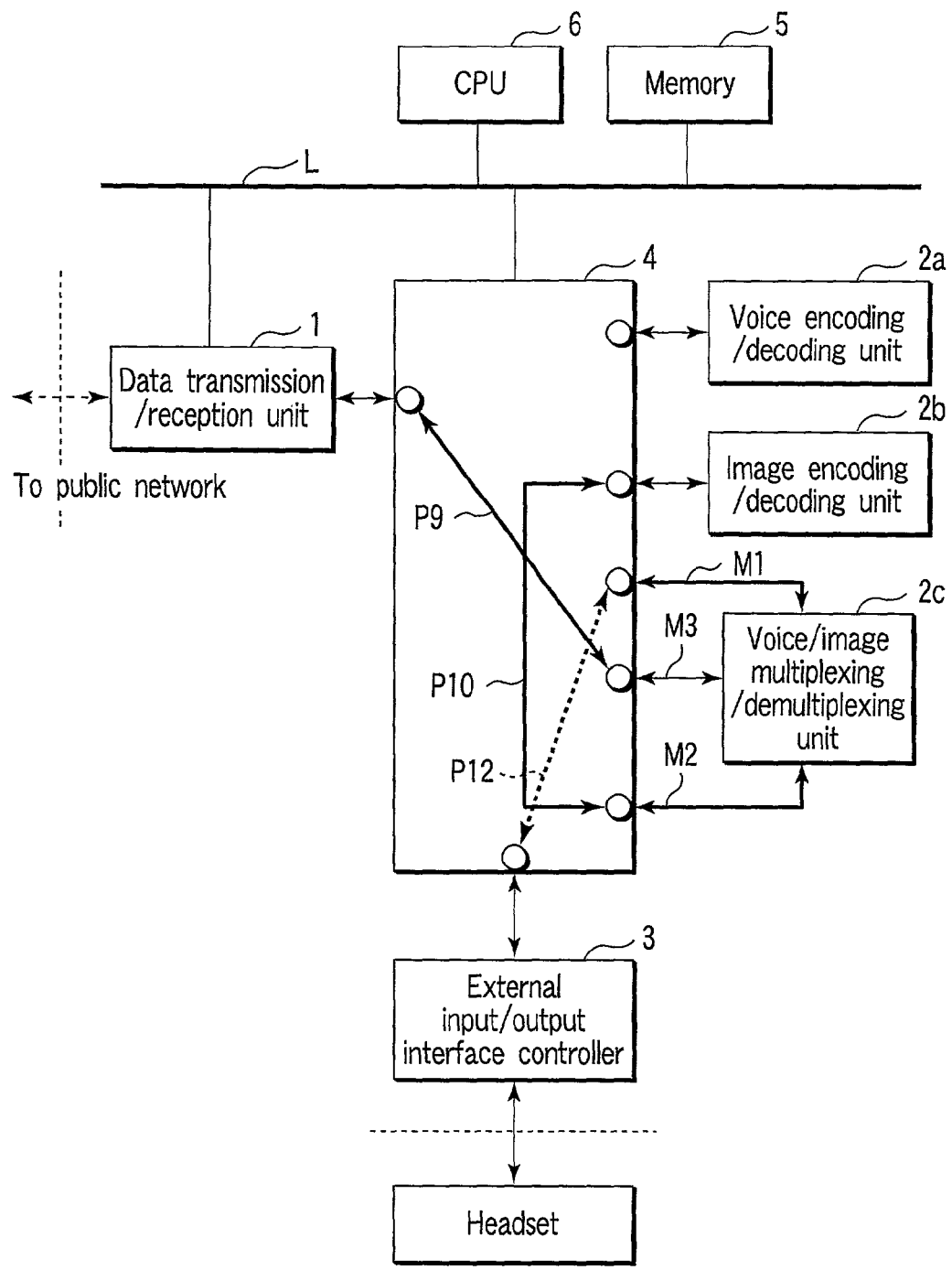
F I G. 14

INFORMATION PROCESSING APPARATUS AND COMMUNICATION FUNCTION EXPANSION METHOD

CROSS-REFERENCE TO RELATED APPLICATIONS

This application is based upon and claims the benefit of priority from the prior Japanese Patent Application No. 2000-233130, filed Aug. 1, 2000, the entire contents of which are incorporated herein by reference.

BACKGROUND OF THE INVENTION

1. Field of the Invention

The present invention relates to an information processing apparatus and a communication function expansion method.

2. Description of the Related Art

In recent years, the use of mobile telephones is spread widely and, at the same time, the main bodies of mobile telephones are made increasingly smaller in size. On the other hand, the demand for realizing a mobile telephone serving as an information processing apparatus having more advanced functions have risen.

To satisfy such a demand, there is proposed expanding the function of a mobile telephone using an external input/output interface (I/F). To be specific, a wire or radio connection interface is provided in a mobile telephone and an external apparatus is connected to the mobile telephone through this interface. For example, Jpn. Pat. Appln. KOKAI Publication No. 9-149107 discloses a mobile telephone having an external terminal for connecting a headset to the mobile telephone. If a headset plug is inserted into the external terminal, in particular, the microphone and the speaker of the mobile telephone are switched over to the microphone and the speaker of the headset.

In addition, Jpn. Pat. Appln. KOKAI Publication No. 8-234931 discloses a switching control circuit for a personal computer which is an information processing apparatus, wherein when a PCMCIA-compatible card is connected to the personal computer, the switching control circuit selects one of the connection of a card connection port with a system bus and the connection of the card connection port with a moving picture dedicated bus in accordance with the function of the card.

However, no consideration has been given to providing a radio external input/output interface on a mobile telephone or personal computer.

Furthermore, no matter which apparatus is connected to the external input/output interface of the mobile telephone, communication between the mobile telephone and an external unit is held only through a public line and other media cannot be used for the communication therebetween. Thus, the expandability of the conventional mobile telephone is insufficient.

BRIEF SUMMARY OF THE INVENTION

Accordingly, it is an object of the present invention to provide an information processing apparatus and a communication function expansion method excellent in expandability with respect to communication with an external unit.

According to one aspect of the present invention, there is provided an information processing apparatus comprising: a system bus; a CPU connected to the system bus; a memory connected to the system bus; a data transmission/reception unit transmitting and receiving data to and from a network; an encoding/decoding unit encoding and decoding the data; an external input/output interface controller controlling an input/output interface with an external unit; and an input/output switching unit selectively forming a data path among the data transmission/reception unit, the encoding/decoding unit and the external input/output interface controller.

According to another aspect of the present invention, there is provided an information processing apparatus comprising: a system bus; a CPU connected to the system bus; a memory connected to the system bus; a data transmission/reception unit transmitting and receiving data to and from a network; an encoding/decoding unit encoding and decoding the data; an external input/output interface controller controlling an input/output interface with an external unit; and an input/output switching unit selectively forming a data path among the external input/output interface controller, the system bus, the data transmission/reception unit and the encoding/decoding unit.

According to still another aspect of the present invention, there is provided an information processing apparatus comprising: a system bus; a CPU connected to the system bus; a memory connected to the system bus; a data transmission/reception unit transmitting and receiving data to and from a network; a first external input/output interface controller controlling a first external input/output interface with an external unit; a second external input/output interface controller controlling a second external input/output interface with the external unit; and an input/output switching unit selectively forming a data path among the first external input/output interface, the second external input/output interface, the system bus and the data transmission/reception unit.

According to still another aspect of the present invention, there is provided an information processing apparatus comprising: a system bus; a CPU connected to the system bus; a memory connected to the system bus; a data transmission/reception unit transmitting and receiving data to and from a network; a voice encoding/decoding unit encoding and decoding voice data; an image encoding/decoding unit encoding and decoding image data; a voice/image multiplexing/demultiplexing unit conducting voice and image multiplexing and demultiplexing to the voice data and the image data; an external input/output interface controller controlling an input/output interface with an external unit; and an input/output switching unit selectively forming a data path among the data transmission/reception unit, the voice encoding/decoding unit, the image encoding/decoding unit, the voice/image multiplexing/demultiplexing unit and the external input/output interface controller.

According to still another aspect of the present invention, there is provided an information processing apparatus comprising: an input/output unit inputting and outputting information; a first communication unit communicating the information inputted and outputted to and from the input/output unit with an external unit; a connection unit connecting an expansion device including a second communication unit different from the first communication unit; and a switching unit switching communication through the first communication unit to communication through the first communication unit and the second communication unit in accordance with connection of the expansion device to the connection unit.

According to still another aspect of the present invention, there is provided an information processing apparatus comprising: an input/output unit inputting and outputting information; a first communication unit communicating the information inputted and outputted to and from the input/output unit with an external unit; a connection unit connecting an expansion device including a second communication unit different from the first communication unit; and a switching unit switching communication through the first communication unit to communication through the second communication unit in accordance with connection of the expansion device to the connection unit.

According to still another aspect of the present invention, there is provided an information processing apparatus comprising: an input/output unit inputting and outputting information; a first communication unit communicating the information inputted and outputted to and from the input/output unit with an external unit; a connection unit selectively connecting a first expansion device including a second communication unit different from the first communication unit, and a second expansion device including a memory storing the information; and a setting unit setting a state of transferring the information without going through the first communication unit if the second expansion device is connected to the connection unit, and setting a state of communication through the first communication unit and the second communication unit if the first expansion device is connected to the connection unit.

According to still another aspect of the present invention, there is provided an information processing apparatus comprising: an input/output unit inputting and outputting information; a first communication unit communicating the information inputted and outputted to and from the input/output unit with an external unit; a connection unit selectively connecting a first expansion device including a second communication unit different from the first communication unit, and a second expansion device including a memory storing the information; and a setting unit setting a state of communication through the second communication unit if the first expansion device is connected to the connection unit, and setting a state of communication through the first communication unit if the second expansion device is connected to the connection unit.

According to still another aspect of the present invention, there is provided an information processing apparatus comprising: an input/output unit inputting and outputting information; a first communication unit communicating voice and image information inputted and outputted to and from the input/output unit with an external unit; a connection unit connecting an expansion device including a second communication unit different from the first communication unit; and a setting unit making a setting for communicating one of the voice information and the image information through the second communication unit in accordance with connection of the expansion device to the connection unit.

According to still another aspect of the present invention, there is provided a communication function expansion method applied to an information processing apparatus including an input/output unit inputting and outputting information, and a first communication unit communicating the information inputted and outputted to and from the input/output unit with an external unit, the method comprising: allowing an expansion device including a second communication unit different from the first communication unit to be connected to the information processing apparatus; and switching communication through the first communication unit to communication through the first communication unit and the second communication unit in accordance with connection of the expansion device to the information processing apparatus.

According to still another aspect of the present invention, there is provided a communication function expansion method applied to an information processing apparatus including an input/output unit inputting and outputting information, and a first communication unit communicating the information inputted and outputted to and from the input/output unit with an external unit, the method comprising: allowing an expansion device including a second communication unit different from the first communication unit to be connected to the information processing apparatus; and switching communication through the first communication unit to communication through the second communication unit in accordance with connection of the expansion device to the information processing apparatus.

According to still another aspect of the present invention, there is provided a communication function expansion method applied to an information processing apparatus including an input/output unit inputting and outputting information, and a first communication unit communicating the information inputted and outputted to and from the input/output unit with an external unit, the method comprising: allowing a first expansion device including a second communication unit different from the first communication unit and a second expansion device including a memory storing the information to be selectively connected to the information processing apparatus; and setting a state of transferring the information without going through the first communication unit if the second expansion device is connected to the information processing apparatus, and setting a state of communication through the first communication unit and the second communication unit if the first expansion device is connected to the information processing apparatus.

According to still another aspect of the present invention, there is provided a communication function expansion method applied to an information processing apparatus including an input/output unit inputting and outputting information, and a first communication unit communicating the information inputted and outputted to and from the input/output unit with an external unit, the method comprising: allowing a first expansion device including a second communication unit different from the first communication unit and a second expansion device including a memory storing the information to be selectively connected to the information processing apparatus; and setting a state of communication through the second communication through the second communication unit if the first expansion device is connected to the information processing apparatus, and setting a state of communication through the first communication unit if the second expansion device is connected to the information processing apparatus.

According to still another aspect of the present invention, there is provided a communication function expansion method applied to an information processing apparatus including an input/output unit inputting and outputting information, and a first communication unit communicating voice information and image information inputted and outputted to and from the input/output unit with an external unit, the method comprising: allowing an expansion device including a second communication unit different from the first communication unit to be connected to the information processing apparatus; and making a setting for communicating one of the voice information and the image information through second communication unit in accordance with connection of the expansion device to the information processing apparatus.

According to still another aspect of the present invention, there is provided an information processing apparatus comprising: a system bus; a CPU connected to the system bus; a memory connected to the system bus; a data transmission unit transmitting data to a network; a data reception unit receiving data from the network; a decoding unit decoding the data received by the data reception unit; an encoding unit encoding data to be transmitted by the data transmission unit; an external input/output interface controller controlling an input/output interface with an external unit; and an input/output switching unit selectively forming a data path among the data reception unit, the data transmission unit, the decoding unit, the encoding unit and the external input/output interface controller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 9 shows data paths in a telephone when a USB headset and a Bluetooth memory card are simultaneously used in the third embodiment of the present invention;

FIG. 14 shows data paths in a videophone terminal when a media separation type videophone is constituted in the fourth embodiment.

DETAILED DESCRIPTION OF THE INVENTION

The embodiments of the present invention will be described hereinafter with reference to the drawings.

Figure 1:
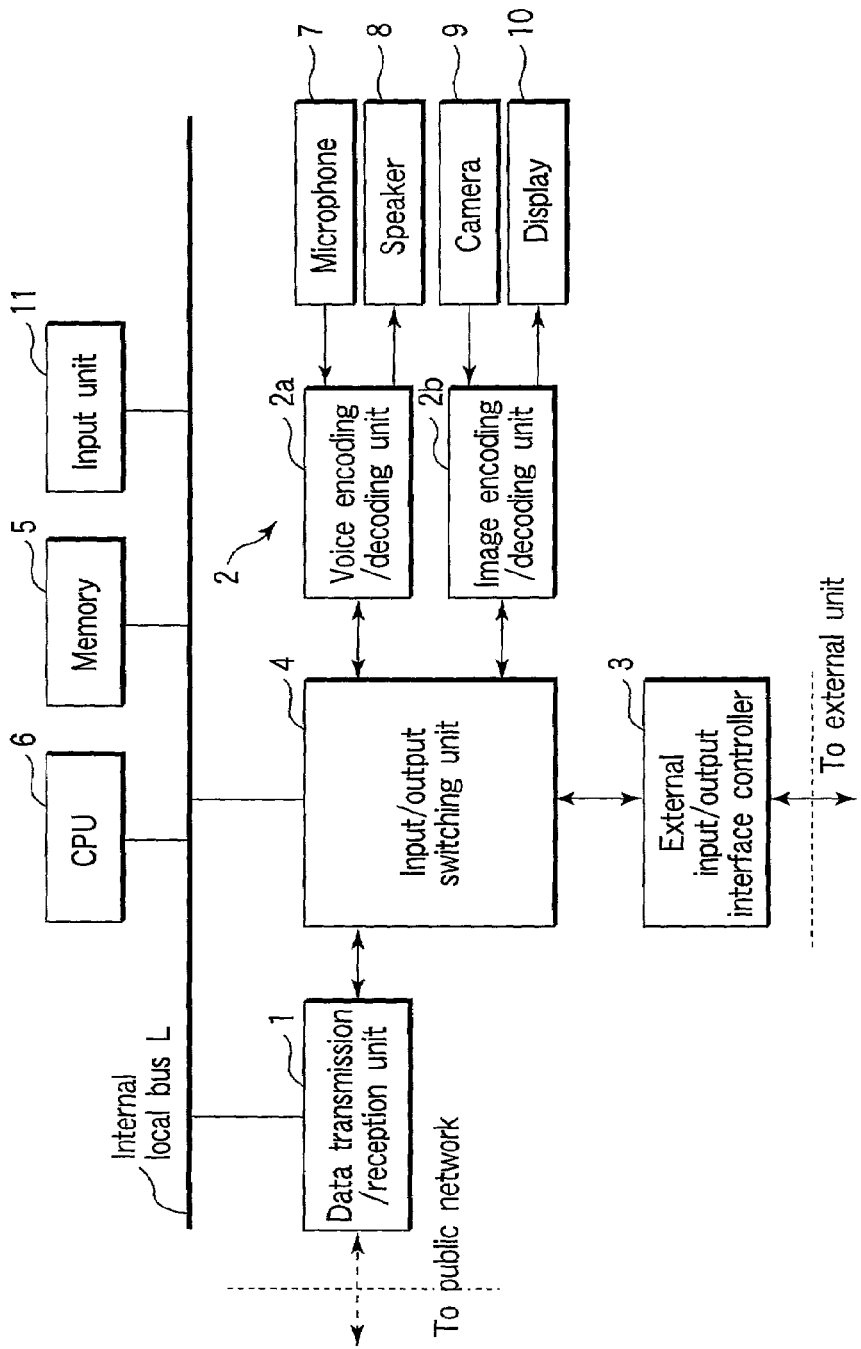
FIG. 1 is a block diagram showing the basic constitution of an information processing apparatus common to the first to fourth embodiments of the present invention.

FIG. 1 is a block diagram showing the basic constitution of an information processing apparatus common to the first to fourth embodiments of the present invention. This information processing apparatus is realized as, for example, a mobile telephone or a personal information processing terminal.

A data transmission/reception unit 1 transmits and receives data to and from a communication counterpart connected to this information processing apparatus through a network such as a public network.

An encoding/decoding unit 2 is provided with a voice encoding/decoding unit 2a and an image encoding/decoding unit 2b. The encoding/decoding unit 2 may be also provided with a voice-picture multiplexing/demultiplexing unit. The voice-picture multiplexing/demultiplexing unit multiplexes and demultiplexes voice and images (pictures) as required.

The voice encoding/decoding unit 2a encodes a voice signal transmitted from a microphone 7 to voice data and transmits the voice data to an input/output switching unit 4. The voice encoding/decoding unit 2a also decodes voice data transmitted from the input/output switching unit 4 to a voice signal and transmits the voice signal to a speaker 8.

The image encoding/decoding unit 2b encodes an image signal transmitted from a camera 9 to image data and transmits the image data to the input/output switching unit 4. The image encoding/decoding unit 2b also decodes image data transmitted from the input/output switching unit 4 to an image signal and transmits the image signal to a display 10.

An external input/output interface controller 3 exercises control relating to an input/output interface with an external unit such as a device, an apparatus or a card externally connected with this information processing apparatus over wire or radio. It is noted that the external input/output interface controller 3 can determine the presence/absence of the connection of an external unit, wire or radio connection, the type of external unit or the like and control the input/output switching unit 4 so that an internal data path may be appropriately set according to the determination result.

Alternatively, the external input/output interface controller 3 may be constituted to be divided into a plurality of external input/output interface controllers 3a, 3b, . . . so as to correspond to a plurality of types of interfaces. The interfaces are exemplified by a USB (Universal Serial Bus) corresponding to an I/O function, an IrDA, a Bluetooth, a PCMCIA corresponding to a card expansion function, and an SD.

The input/output switching unit 4, which is controlled by either a CPU 6 or the external input/output interface controller 3, switches over an internal data bus and selectively, electrically connects an internal local bus (system bus) L, the data transmission/reception unit 1, the voice encoding/decoding unit 2a, the image encoding decoding unit 2b and the external input/output interface controller 3 among one another.

A memory 5 stores various programs and data necessary for this information processing apparatus. The memory 5 is also used to store data acquired from the external unit, the public network and the like.

The CPU 6 is connected to the data transmission/reception unit 1, the input/output switching unit 4, the memory 5 and the like through the internal local bus L and controls the overall information processing apparatus. It is noted that the CPU 6 can control the input/output switching unit 4 to appropriately set the internal data bus according to the user's key input operation through an input unit 11 so as to establish a communication structure desired by the user.

For example, the CPU 6 controls the input/output switching unit 4 so that the data stored in the memory 5 can be transmitted to the external unit through the external input/output interface controller 3, to the public network through the data transmission/reception unit 1 or outputted as voice or images from the speaker or the display. Conversely, the CPU 6 controls the input/output switching unit 4 so that voice signals or image signals outputted from a microphone or a camera can be stored as data in the memory 5 or data transmitted from the external unit or data transmitted from the public network can be stored in the memory 5.

The microphone 7 captures voice such as a user's voice and transmits the voice as an electric signal to the voice encoding/decoding unit 2a.

The speaker 8 converts the electric signal transmitted from the voice encoding/decoding unit 2a into voice and outputs voice.

The camera 9 captures an image such as a user's image and transmits the image as an electric signal to the image encoding/decoding unit 2b.

The display 10 converts the electric signal transmitted from the image encoding/decoding unit 2b into an image and displays the image.

The input unit 11 is a portion on which the user carries out a key input operation.

The information processing apparatus constituted as stated above will be described while referring to a plurality of embodiments.

FIRST EMBODIMENT

In the first embodiment, description will be given of a case where a headset is used as the external unit of the information processing apparatus. It is assumed herein that the information processing apparatus is a mobile telephone. In this embodiment, description will be also given of a case of a call between mobile telephones not through a base station.

Figure 2:
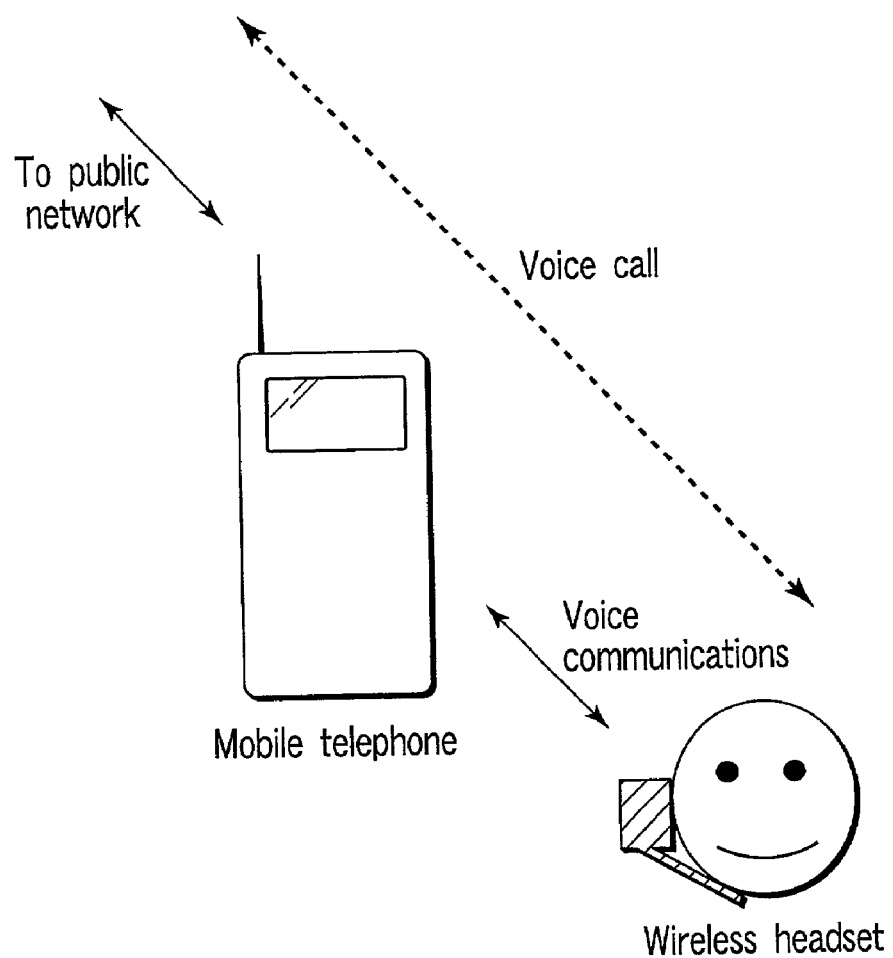
FIG. 2 shows a state in which a wireless headset is used in the first embodiment of the present invention.

FIG. 2 shows a state in which a wireless headset is used in this embodiment. Namely, a user puts on the wireless headset and has a handsfree call (a call without holding the mobile telephone by hand) with a party on the other end of the line through an interface such as Bluetooth. It is noted that the headset has a function corresponding to the microphone 7, the speaker 8 and the voice encoding/decoding unit 2a shown in FIG. 1.

If a user's voice or the like is captured by the microphone of the wireless headset, a voice signal is transmitted from the wireless headset to this mobile telephone. On the other hand, if a voice signal transmitted from the mobile telephone on the other end of the line through the public network is received by this videophone terminal, the voice signal is fed to the wireless headset and voice is emitted from the speaker of the wireless head.

Figure 3:
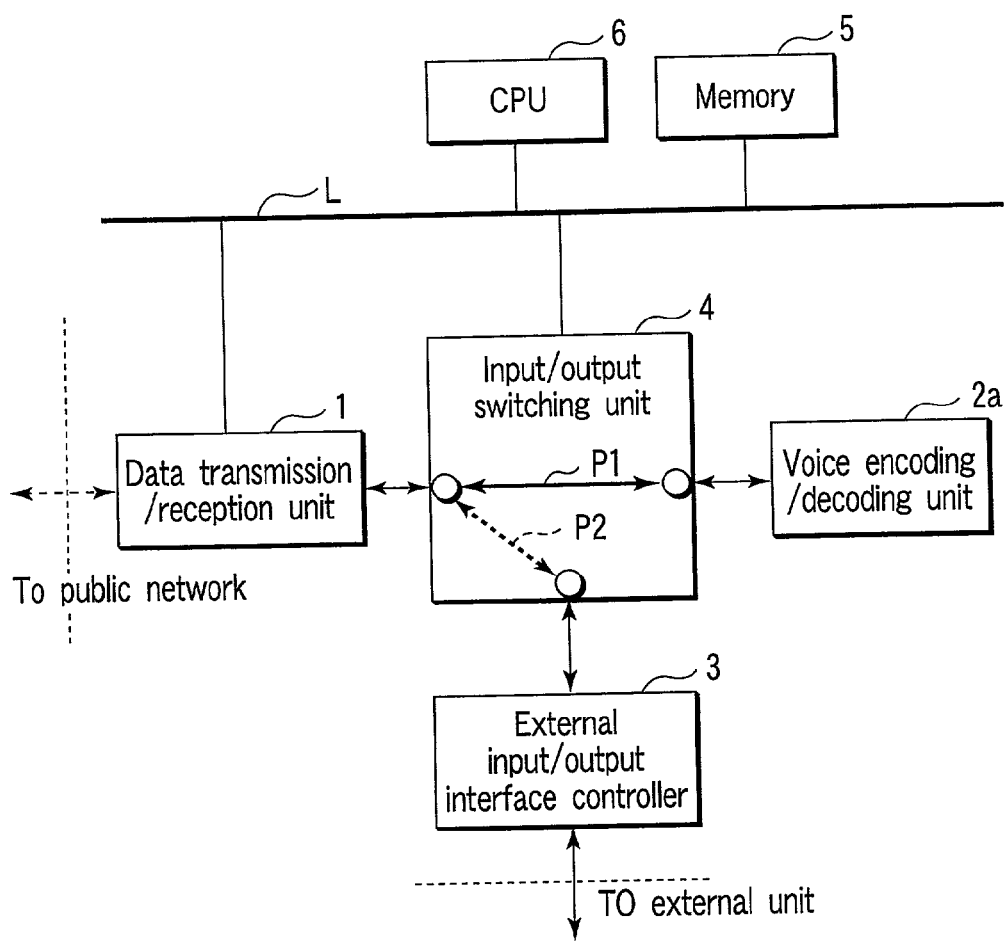
FIG. 3 shows data paths in a telephone when the headset is used in the first embodiment.

FIG. 3 shows data paths in the telephone if the headset is used in this embodiment. It is noted that the constituent elements common to FIG. 1 are denoted by the same reference symbols and not described in detail herein.

In the first embodiment, the external input/output interface controller 3 is provided with a module corresponding to Bluetooth and is capable of holding radio communication with the Bluetooth wireless headset. The external input/output interface controller 3 is capable of having wire communication with the headset connected to this mobile telephone through a plug.

If radio communication with the headset is suspended, the external input/output interface controller 3 detects whether or not a radio link is established and thereby determines whether or not the mobile telephone is connected to the headset. On the other hand, if wire communication with the headset is suspended, the external input/output interface controller 3 detects whether or not a plug connection is established and thereby determines whether or not the headset is connected to this mobile telephone.

If the headset is not connected, it is necessary for the mobile telephone main body to input and output voice. In this case, the external input/output interface controller 3 electrically connects the voice encoding/decoding unit 2a with the data transmission/reception unit 1 and, therefore, controls the input/output switching unit 4 so as to form a data path P1.

If the headset is connected, the mobile telephone main body does not input and output voice. In this case, the external input/output interface controller 3 electrically connects the controller 3 itself with the data transmission/reception unit 1 and, therefore, controls the input/output switching unit 4 so as to sever the data path P1 and to form a data path P2. As a result, a path from the headset to the mobile telephone on the other end of the line through this mobile telephone and the public network is formed.

Figure 4:
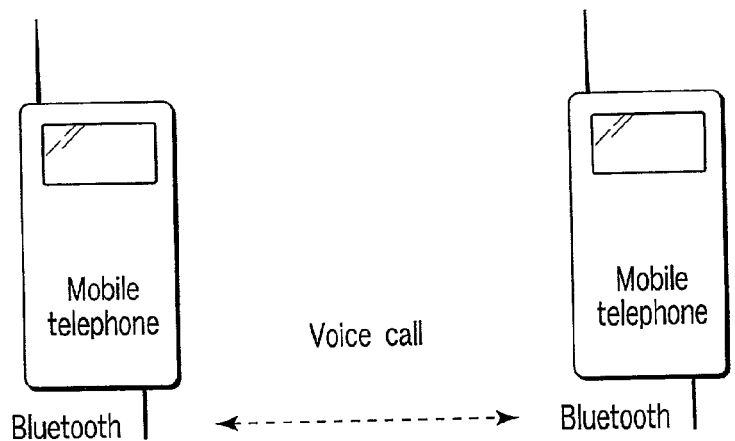
FIG. 4 is an explanatory view for a Bluetooth transceiver function used in the first embodiment.

Meanwhile, if this mobile telephone and the mobile telephone on the other end of the line which make a call with each other are provided with the functions corresponding to Bluetooth, respectively such as transceivers, voice communication may be possibly held between the two mobile telephones not through a base station. FIG. 4 shows a state in this case. The mobile telephone in this embodiment is capable of dealing with such a communication method.

Figure 5:
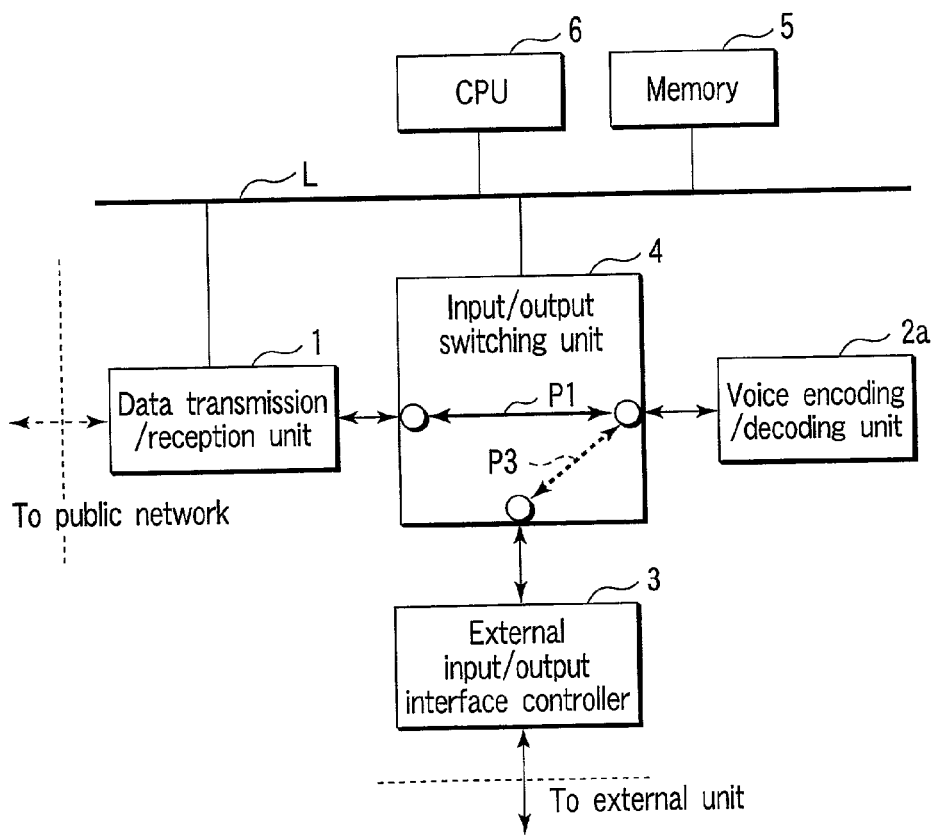
FIG. 5 shows data paths in the telephone when the transceiver function is used in the first embodiment.

FIG. 5 shows data paths in the telephone if the transceiver function is used in this embodiment.

The external input/output interface controller 5 can determine whether or not a direct call connection (connection without using a base station) with the mobile telephone on the other end of the line is established by employing the Bluetooth function.

If the Bluetooth transceiver function is not used, it is necessary to make a call through the public network. In this case, the external input/output interface controller 3 electrically connects the voice encoding/decoding unit 2a with the data transmission/reception unit 1 and, therefore, controls the input/output switching unit 4 so as to form a data path P1.

On the other hand, if the Bluetooth transceiver function is used, no call is established through the public network. Therefore, the external input/output interface controller 3 electrically connects the controller 3 itself with the voice encoding/decoding unit 2a and controls the input/output switching unit 4 so as to sever the data path P1 and to form a data path P3. As a result, a bus directly connected from this mobile telephone to the mobile telephone on the other end of the line through the external input/output interface controller 3 is formed.

Description has been given of a case where the external input/output interface controller 3 automatically controls the input/output switching unit 4 to switch over the data path. Alternatively, the switching operation can be controlled according to the key input operation or the like of the user. In the latter case, if the user makes a setting for using the headset by the key input operation or the like, the CPU 6 detects this setting and controls the input/output switching unit 4 to sever the data path P1 and to form a data path P2. If the user makes a setting for using the transceiver function by the key input operation or the like, the CPU 6 detects this setting and controls the input/output switching unit 4 to sever the data path P1 and to form a data path P3.

As can be seen, according to the first embodiment, to realize the communication method for handsfree calls by connecting the external headset with this mobile telephone and the communication method for direct calls between the two mobile telephones not through a base station, it is possible to appropriately switch over the internal data path and to easily, efficiently transmit voice data through the external input/output interface.

SECOND EMBODIMENT

In the second embodiment, description will be given of a case of using an SD card as the external unit of the information processing apparatus. The SD card may be, for example, an SD card having a Bluetooth function or an SD card having a USB function. In this embodiment, it is assumed that the SD card having the Bluetooth function is used. It is also assumed herein that the information processing apparatus is a mobile telephone.

The SD standards include an SD I/O standard (for SD I/O cards) which is in the process of definition as well as an SD memory standard (for SD memory cards) which is already open. Under this SD I/O standard, it is assumed that voice, images and the like can be transmitted besides the normal transfer of data. It is considered that the SD I/O standard will be widely used as an expansion interface in the future.

Figure 6:
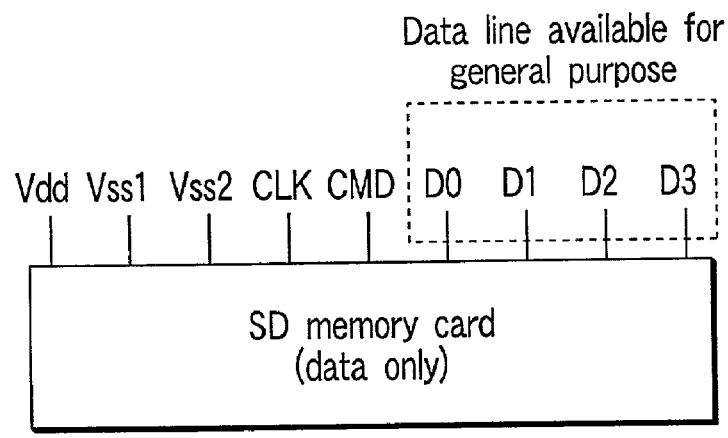
FIG. 6 shows the constitution of an SD memory card.
Figure 7:
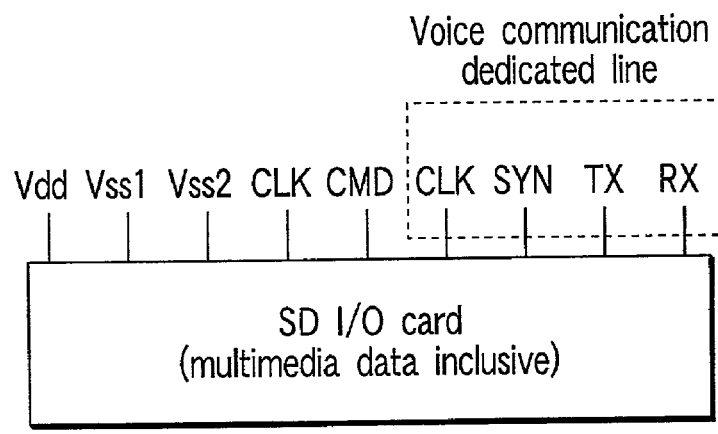
FIG. 7 shows the constitution of an SD I/O card.

FIGS. 6 and 7 show the constitution of an SD memory card and the constitution of an SD I/O card, respectively.

Under the SD standard, the SD memory card is provided with nine pins and is connected with a host controller through these pins. The SD memory card is provided with pins relating to a signal line common to the SD I/O card and pins relating to a general-purpose data line. The SD I/O card is provided with pins relating to a signal line common to the SD memory card and pins relating to a dedicated line for the transmission of multimedia data (data such as voice data and image data). The arrangement positions of the pins relating to this dedicated line correspond to the arrangement positions of the pins relating to the general-purpose data line of the SD memory card. In this embodiment, the mobile telephone can satisfy the connection of the SD memory card with the telephone and the connection of the SD I/O card with the telephone.

Figure 8:
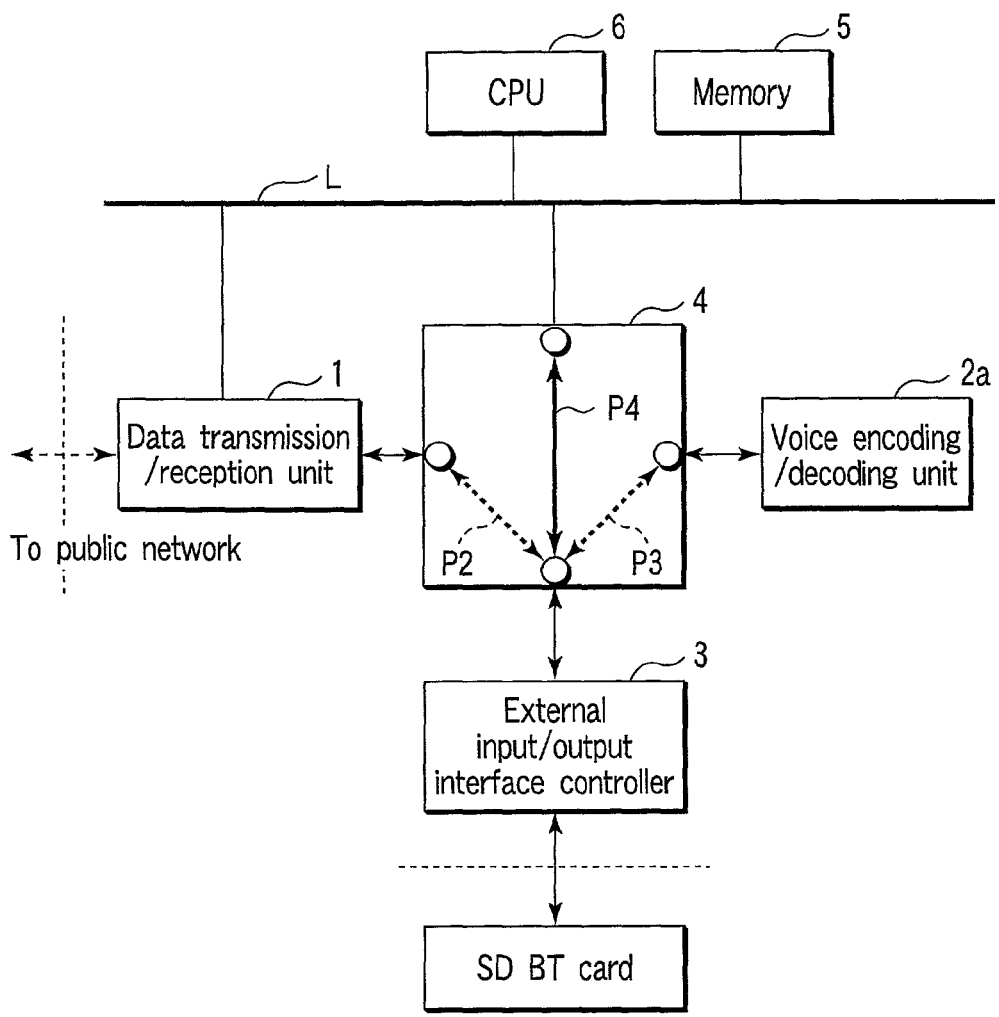
FIG. 8 shows data path switching in a telephone if the type of SD card used is changed to another in the second embodiment of the present invention.

FIG. 8 shows data path switching in the telephone if the type of SD card used is changed in this embodiment. It is noted that the constituent elements common to FIG. 1 are denoted by the same reference symbols and not described herein in detail.

The external input/output interface controller 3 corresponds to the host controller stated above. This external input/output interface controller 3 has a mechanism for detecting the connection of the SD card. The external input/output interface controller 3 can also detect which of the SD memory card or the SD I/O card is connected to the mobile telephone, by exchanging signals or the like. Further, the external input/output interface controller can detect whether or not the SD I/O card realizes the above-stated transceiver function if the SD I/O card is connected.

If the SD memory card is connected to the mobile telephone, it is necessary for the mobile telephone to conduct the transfer of data to the memory 5 through an internal local bus L or the like. The interface controller 3 electrically connects the controller 3 itself with the internal local path L and, therefore, controls the input/output switching unit 4 so as to form a data path P4.

If the SD I/O card which does not realize the transceiver function is connected, it is necessary that the mobile telephone transmits data such as voice data to an external unit (e.g., the storage device of a computer) through the public network. Therefore, to electrically connect the external input/output interface controller 3 with the data transmission/reception unit 1, the interface controller 3 controls the input/output switching unit 4 to sever the data path P4 and to form a data path P2. As a result, a path from the SD I/O card to the external unit through this mobile telephone and the public network is formed.

On the other hand, if the SD I/O card realizing the transceiver function is connected, it is necessary for the mobile telephone to be able to make a direct call with a party on the other end of the line, not through the public network. Therefore, to electrically connect the external input/output interface controller 3 with the voice encoding/decoding unit 2a, the interface controller 3 controls the input/output switching unit 4 to form a data path P3. As a result, a path for directly connecting this mobile telephone to the mobile telephone on the other end of the line through the external input/output interface controller 3 and the SD I/O card is formed.

If neither the SD memory card nor the SD I/O card are connected, the data path P1 is formed as in the case of FIG. 3.

In this embodiment, description has been given while taking, as examples, a case where the data path P4 is formed to transfer data or the like to the memory 5 through the internal local bus L if the SD memory card is connected and a case where the data path P2 is formed to transmit data such as voice data to the external unit through the public network if the SD I/O card which does not realize the transceiver function is connected (see FIG. 8). The present invention is not limited to the embodiment and can be modified according to purposes. For example, if the SD memory card is connected, the input/output switching unit 4 may be controlled to form the internal data path P2 so as to communicate with the external unit through the public network. If the SD I/O card is connected, the input/output switching unit 4 may be controlled to form the data path P4 to transfer data to/from the memory 5 through the internal local path L.

As can be understood from the above, to realize the communication method for transferring multimedia data by connecting the SD I/O card to the mobile telephone or the communication method for establishing a direct call with the mobile telephone with the other mobile telephone not through the base station, it is possible to appropriately switch over the internal data path and to easily, efficiently transmit voice data or the like through the external input/output interface.

THIRD EMBODIMENT

The third embodiment will be described while taking, as an example, a case of using a plurality of external units having different types of interfaces to simultaneously connect these external units with an information processing apparatus. The interfaces may be exemplified by a Bluetooth and a USB. The external unit may be exemplified by a headset and a memory card. As in the case of the preceding embodiments, it is assumed herein that the information processing apparatus is a mobile telephone.

FIG. 9 shows data paths in the telephone if a USB headset and a Bluetooth memory card are simultaneously used in this embodiment. It is noted that constituent elements common to FIG. 1 are denoted by the same reference symbols and not described herein in detail.

A mobile telephone main body is provided with an external input/output interface controller 3a corresponding to USB and an external input/output interface controller 3b corresponding to Bluetooth. Each of the external input/output interface controllers can control an input/output switching unit 4 to determine the presence/absence of the connection of an external unit, wire or radio communication, the type of external unit or the like, and to appropriately set an internal data bus according to the determination result.

If the Bluetooth memory card and the USB headset are connected, the USB external input/output interface controller 3a controls the input/output switching unit 4 to form a data path P5 so as to electrically connect the controller 3a itself with a data transmission/reception unit 1. By so controlling, a path from the headset to the mobile telephone of a party on the other end of the line through this mobile telephone and a public network is formed. The Bluetooth external input/output interface controller 3b controls the input/output switching unit 4 to form a data path P6 so as to electrically connect the controller 3b itself with an internal local bus L.

Figure 10:
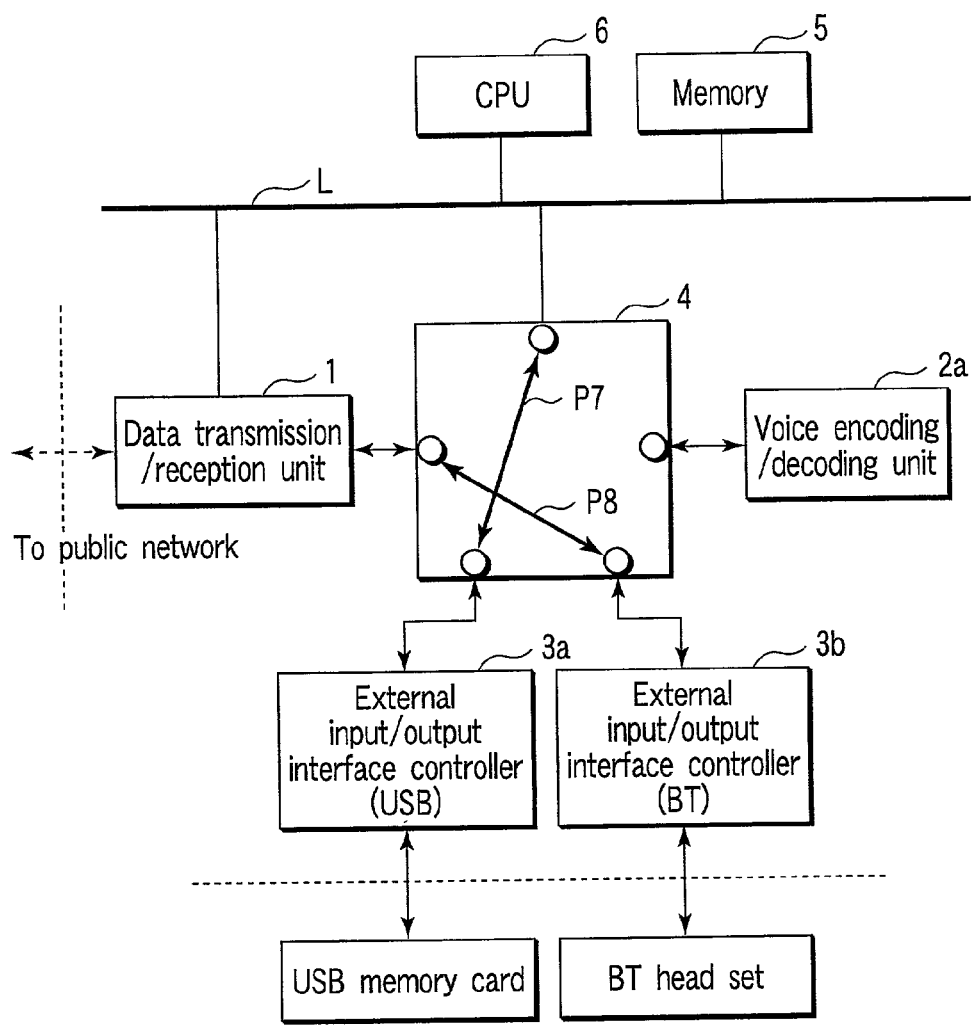
FIG. 10 shows data paths in a telephone when the USB headset and the Bluetooth memory card are simultaneously used in the third embodiment.

FIG. 10 shows data paths in the telephone if the USB memory card and the Bluetooth headset are simultaneously used.

If the USB memory card and the Bluetooth headset are connected, the USB external input/output interface controller 3a controls the input/output switching unit 4 to form a data path P7 so as to electrically connect the controller 3a itself with the internal local bus L. The Bluetooth external input/output interface controller 3b controls the input/output switching unit 4 to form a data path P8 so as to electrically connect the controller 3b itself with the data transmission/reception unit 1. As a result, a path from the headset to the mobile telephone of a party on the other end of the line through this mobile telephone and the public network is formed.

As can be understood from the above description, according to the third embodiment, if a plurality of external units having different types of interfaces are used and connected to a mobile telephone, it is possible to appropriately switch over the internal data path and to easily, efficiently transmit data through the input/output interface.

FOURTH EMBODIMENT

The fourth embodiment will be described while taking, as an example, a case where an information processing apparatus is a videophone terminal and a headset is used as the external unit of the videophone terminal. The videophone terminal is realized in the form of either a mobile telephone or a personal information processing terminal.

As a videophone standard, the H.324 standard of the ITU is well known. Here, a structure and a protocol for realizing the function of the videophone function will be briefly described.

Figure 11:
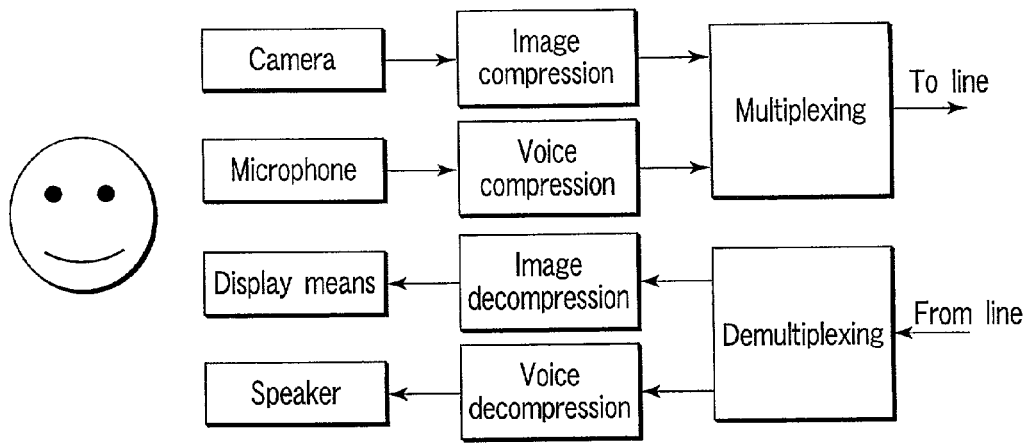
FIG. 11 is an explanatory view for the basic mechanism of a videophone.

Videophones require a mechanism for synchronizing voice with an image by combining two types of information, i.e., voice information and image information so as to simultaneously transmit both information onto a line (or receive the both information from the line). That is, to realize the videophone, multiplexing/demultiplexing means as well as voice compression/decompression means and image compression/decompression means are required as shown in FIG. 11. As is obvious from FIG. 11, if data is transmitted, image information acquired by compressing images from a camera and voice information acquired by compressing voice from a microphone are multiplexed in one stream. Conversely, if data is received, image information and voice information are demultiplexed from one stream. After demultiplexing, the image data and the voice data are decompressed, an image is displayed on a display and voice is outputted from a speaker.

Figure 12:
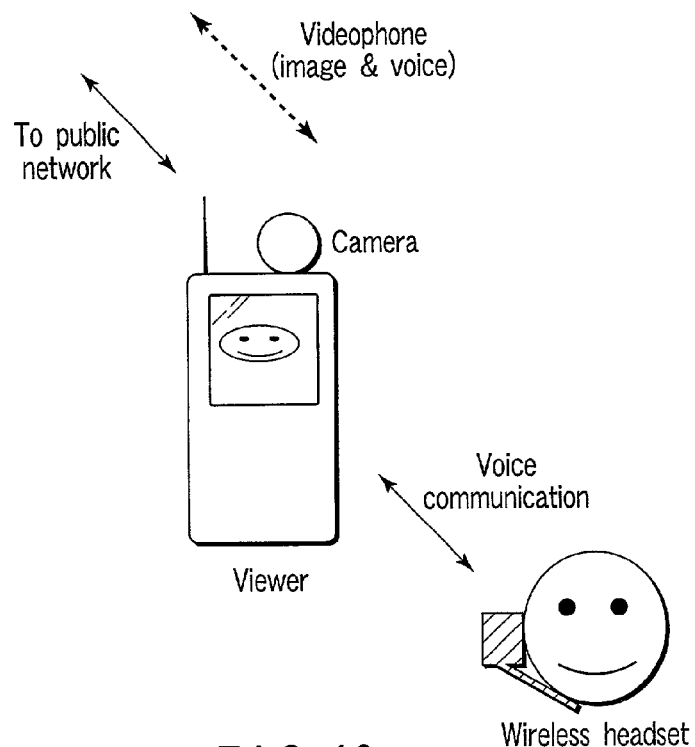
FIG. 12 shows a state in which a media separation type videophone terminal is realized in the fourth embodiment of the present invention.

FIG. 12 shows a state in which a media separation type videophone terminal is realized in this embodiment. That is, a user puts on a wireless headset and makes a handsfree call with a part on the other end of the line using the videophone terminal. Here, an image terminal and a voice terminal are separated. That is, a videophone terminal main body is used as an image viewer, while a wireless headset is used as a voice terminal without using a microphone and a speaker mounted on the videophone terminal.

A user's voice or the like is captured by the microphone of the wireless headset and an image such as the image of user's face is captured by a camera. The voice and image are multiplexed in the videophone terminal and transmitted as a voice-image multiplexed signal to the videophone terminal of the party on the other end of the line through a public network. On the other hand, if the videophone terminal of this information processing apparatus receives a voice-image multiplexed signal transmitted from the videophone terminal of the party on the other end of the line through the public network, the signal is demultiplexed to voice and an image in the apparatus. Then, the voice is outputted from the speaker of the wireless headset and, at the same time, the image is displayed on the image viewer (display).

Figure 13:
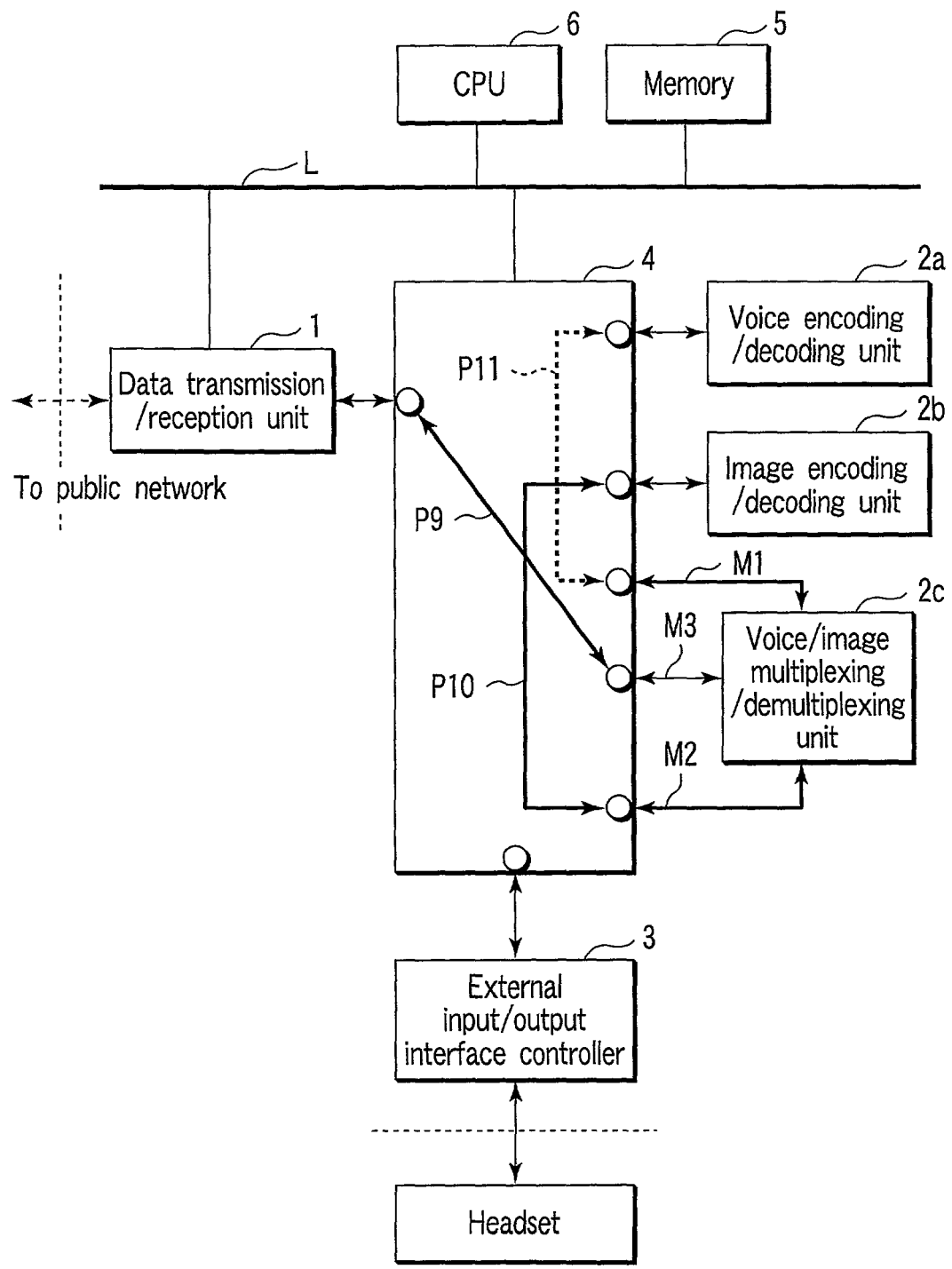
FIG. 13 shows data paths in a videophone terminal when a media integrated type videophone is constituted in the fourth embodiment.

FIG. 13 show data paths in the videophone terminal if a media integrated type videophone is constituted in this embodiment. FIG. 14 show data paths in the videophone terminal if a media separation type videophone is constituted in this embodiment. It is noted that constituent elements common to FIG. 1 are denoted by the same reference symbols and are not described in detail herein.

A public network shown in FIGS. 13 and 14 is, for example, the third generation network corresponding to a W-CDMA system. The videophone terminal is also provided with a voice-image multiplexing/demultiplexing unit 2c as well as a voice encoding/decoding unit 2a and an image encoding/decoding unit 2b. The voice-image multiplexing/demultiplexing unit 2c and an input/output switching unit 4 are connected to each other by three lines, i.e., a line M1 for transmitting voice data, a line M2 for transmitting image data and a line M3 for transmitting voice-image multiplexed data.

In this embodiment, the data path switching of the input/output switching unit 4 can be controlled by a CPU 6 in accordance with the user's key input operation or the like. In this case, if a user makes a setting for constituting a media integral system by the key input operation or the like, the CPU 6 detects this setting and, as shown in FIG. 13, controls the input/output switching unit 4 to form data paths P9 to P11. If the user makes a setting for constituting a media separation system, the CPU 6 also detects this setting and, as shown in FIG. 14, controls the input/output switching unit 4 to sever the data path P11 and to form a data path P12.

As shown in FIG. 13, if the media integrating system is established and the data transmission/reception unit 1 receives voice-image multiplexed data from the videophone terminal of the party on the other end of the line through the public network, then the data is transmitted to the voice-image multiplexing/demultiplexing unit 2c through the data path P9 and the line M3. The voice-image multiplexed data thus transmitted is demultiplexed to image data and voice data by the voice-image multiplexing/demultiplexing unit 2c. The image data is transmitted to the image encoding/decoding unit 2b through the line M2 and the data path P10 and an image is displayed on the display. The voice data is transmitted to the voice encoding/decoding unit 2a through the line M1 and the data path P11 and voice is emitted from the speaker.

Further, if an image such as the image of the user's face is captured by the camera, image data is transmitted from the image encoding/decoding unit 2b to the voice-image multiplexing/demultiplexing unit 2c. If the user's voice or the like is captured by the microphone, voice data is transmitted from the voice encoding/decoding unit 2a to the voice-image multiplexing/demultiplexing unit 2c. The image data and the voice data are multiplexed by the voice-image multiplexing/demultiplexing unit 2c to voice-image multiplexed data. This voice-image multiplexed data is transmitted to the data transmission/reception unit 1 through the line M3 and the data path P9 and then to the videophone terminal of the party on the other end of the line through the public network.

As shown in FIG. 14, if the media separation system is established and the data transmission/reception unit 1 receives voice-image multiplexed data from the videophone terminal of the party on the other end of the line through the public network, then the data is transmitted to the voice-image multiplexing/demultiplexing unit 2c through the data path P9 and the line M3. The voice-image multiplexed data is demultiplexed to image data and voice data by the voice-image multiplexing/demultiplexing unit 2c. The image data is transmitted to the image encoding/decoding unit 2b through the line M2 and the data path P10 and an image is displayed on the display. The voice data is transmitted to the external input/output interface controller 3 through the line m1 and the data path P12 and further to the headset and voice is emitted from the speaker of the headset.

Moreover, if an image such as the image of the user's face is captured by the camera, image data is transmitted from the image encoding/decoding unit 2b to the voice-image multiplexing/demultiplexing unit 2c. If user's voice or the like is captured by the microphone of the headset, voice data is transmitted to the external input/output interface controller 3 from the headset and further to the voice-image multiplexing/demultiplexing unit 2c. The image data and the voice data are multiplexed by the voice-image multiplexing/demultiplexing unit 2c to voice-image multiplexed data. This data is transmitted to the data transmission/reception unit 1 through the line M3 and the data path P9 and then to the videophone terminal of the party on the other end of the line through the public network.

As can be understood from the above, according to the fourth embodiment, if the videophone terminal is used while the system thereof is switched between the media integrated system and the media separation system, it is possible to appropriately switch over the internal data path and to easily, efficiently transmit multimedia data.

In this embodiment, description has been given of a case where the headset is connected to the videophone terminal as an external unit. Alternatively, an image viewer may be connected thereto so as to hold picture communication between the videophone terminal and the image viewer. In the latter case, internal data paths may be formed in the same manner as that described with reference to FIG. 14.

As stated so far in detail, the present invention can provide an information processing apparatus and a communication function expansion method excellent in expandability with respect to communication with an external unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a system bus;
a CPU connected to said system bus;
a memory connected to said system bus;
a data transmission/reception unit transmitting and receiving data to and from a network;
an encoding/decoding unit encoding and decoding data;
an external input/output interface controller controlling an input/output interface with an external unit;
an input/output switching unit selectively forming a data path among said data transmission/reception unit, said encoding/decoding unit, and said external input/output interface controller; and
a control unit controlling said input/output switching unit to selectively form the data path connecting said data transmission/reception unit to said encoding/decoding unit and the data path connecting said data transmission/reception unit to said external input/output interface controller in accordance with a communication system.

2. The apparatus according to claim 1, wherein said control unit controls said input/output switching unit to form the data path connecting said external input/output interface controller to said encoding/decoding unit.

3. The apparatus according to claim 1, wherein said control unit controls said input/output switching unit in accordance with an input operation of a user.

4. The apparatus according to claim 1, wherein said control unit is implemented by said external input/output interface controller.

5. An information processing apparatus comprising:
a system bus;
a CPU connected to said system bus;
a memory connected to said system bus;
a data transmission/reception unit transmitting and receiving data to and from a network;
an encoding/decoding unit encoding and decoding data;
an external input/output interface controller controlling an input/output interface with an external unit;
an input/output switching unit selectively forming a data path among said external input/Output interface controller, said system bus, said data transmission/reception unit, and said encoding/decoding unit; and
a control unit controlling said input/output switching unit to selectively form the data path connecting said external input/output interface controller to said system bus and the data path connecting said external input/output interface controller to said data transmission/reception unit in accordance with a communication system.

6. The apparatus according to claim 5, wherein said control unit controls said input/output switching unit so as to form the data path connecting said external input/output interface controller to said encoding/decoding unit.

7. An information processing apparatus comprising:
a system bus;
a CPU connected to said system bus;
a memory connected to said system bus;

a data transmission/reception unit transmitting and receiving data to and from a network;

a first external input/output interface controller controlling a first external input/output interface with an external unit;

a second external input/output interface controller controlling a second external input/output interface with the external unit;

an input/output switching unit selectively forming a data path among said first external input/output interface, said second external input/output interface, said system bus, and said data transmission/reception unit; and a control unit controlling said input/output switching unit to simultaneously form the data path connecting said first external input/output interface to the system bus and the data path connecting said second external input/output interface to said data transmission/reception unit.

8. An information processing apparatus comprising:

a system bus;

a CPU connected to said system bus;

a memory connected to said system bus;

a data transmission/reception unit transmitting and receiving data to and from a network;

a voice encoding/decoding unit encoding and decoding voice data;

an image encoding/decoding unit encoding and decoding image data;

a voice/image multiplexing/demultiplexing unit conducting voice and image multiplexing and demultiplexing to the voice data and the image data;

an external input/output interface controller controlling an input/output interface with an external unit;

an input/output switching unit selectively forming a data path among said data transmission/reception unit, said voice encoding/decoding unit, said image encoding/decoding unit, said voice/image multiplexing/demultiplexing unit, and said external input/output interface controller; and a control unit controlling said input/output switching unit to simultaneously form the data path connecting said data transmission/reception unit to a voice and image multiplexing data line of said voice/image multiplexing/demultiplexing unit, the data path connecting a voice data line of said voice/image multiplexing/demultiplexing unit to said voice encoding/decoding unit, and the data path connecting an image data line of said voice/image multiplexing/demultiplexing unit to said image encoding/decoding unit.

9. The apparatus according to claim 8, wherein said control unit controls said input/output switching unit to sever the data path connecting the voice data line of said voice/image multiplexing/demultiplexing unit to said voice encoding/decoding unit and to form the data path connecting the voice data line of said voice/image multiplexing/demultiplexing unit to said external input/output interface controller.

10. The apparatus according to claim 8, wherein said control unit controls said input/output switching unit to sever the data path connecting the image data line of said voice/image multiplexing/demultiplexing unit to said image encoding/decoding unit and to form the data path connecting the image data line of said voice/image multiplexing/demultiplexing unit to said external input/output interface controller.

* * * * *